United States Patent [19]
Schaefer, Jr. et al.

[11] 3,843,187
[45] Oct. 22, 1974

[54] DEMI-DISCONNECTABLE FINGER

[75] Inventors: Hans F. Schaefer, Jr.; David W. France, both of West Newbury, Mass.

[73] Assignee: USM Corporation, Boston, Mass.

[22] Filed: Mar. 9, 1973

[21] Appl. No.: 339,597

[52] U.S. Cl............... 294/106, 294/86 R, 269/285, 214/1 CM
[51] Int. Cl............................................ B25j 15/00
[58] Field of Search............ 294/16, 86 R, 88, 103, 294/104, 106, 115, 116, 99 R; 3/1.2, 12.7; 214/1 CM, 1 B, 1 BB, 1 BC, 1 BD, 147 T; 269/257, 263, 285, 32, 58

[56] References Cited
UNITED STATES PATENTS

| 1,402,677 | 1/1922 | Smith | 294/99 S |
| 3,219,376 | 11/1965 | Peters | 294/16 |
| 3,425,732 | 2/1969 | Reich | 294/16 |
| 3,630,391 | 12/1971 | Wilson | 214/1 BB |
| 3,739,923 | 6/1973 | Totsuka | 214/1 CM |

Primary Examiner—Evon C. Blunk
Assistant Examiner—Johnny D. Cherry
Attorney, Agent, or Firm—Ralph D. Gelling; Vincent A. White; Richard B. Megley

[57] ABSTRACT

An article grasping finger on a hand-like element disconnects from an operative position to an inoperative position still on the hand under excessive force applied to the finger. A device detects such demi-detachment and provides a signal indication of the condition. In its operative position, the finger is held against movement relative to the hand for article grasping movement therewith.

4 Claims, 6 Drawing Figures

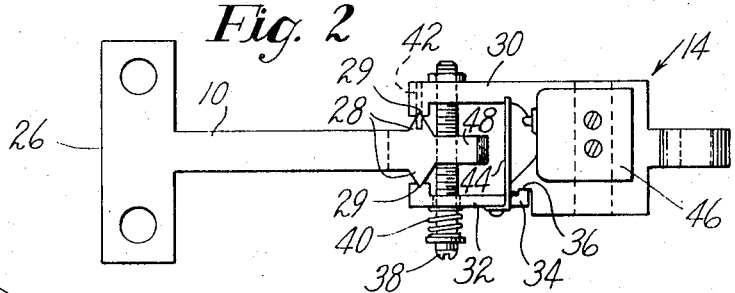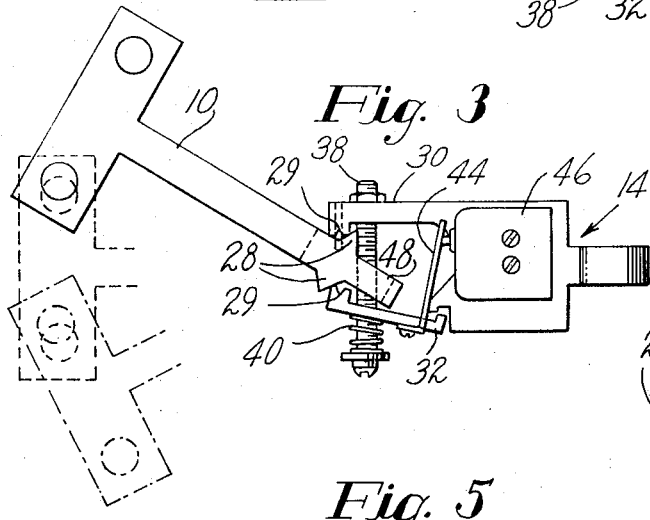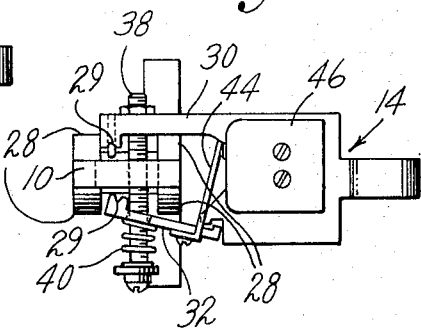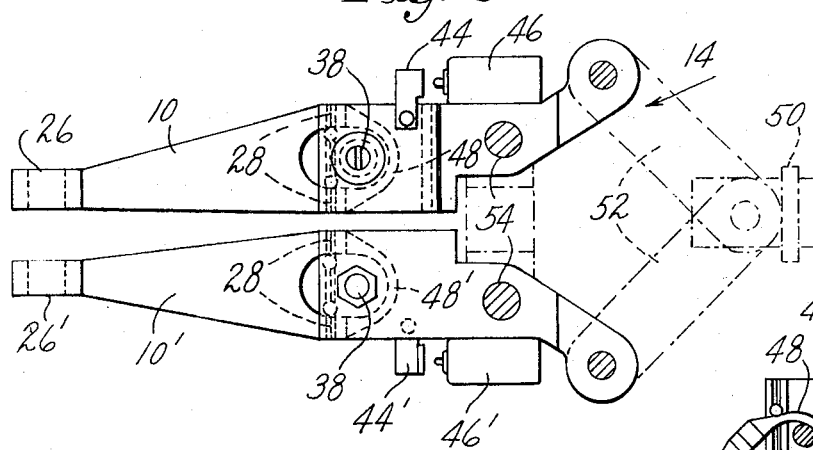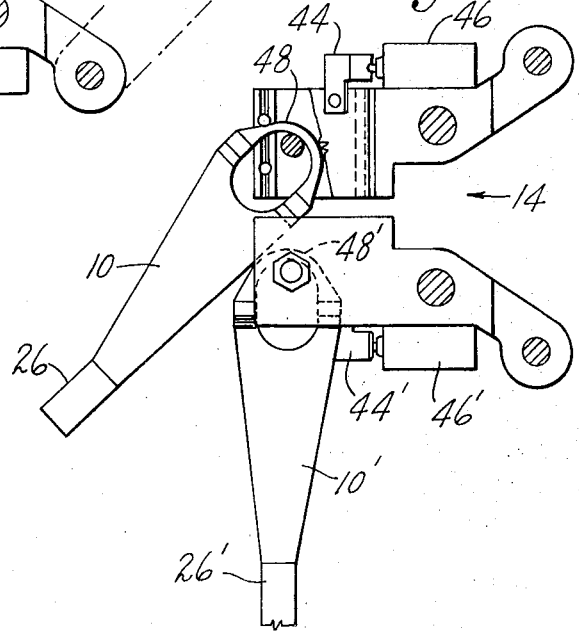

DEMI-DISCONNECTABLE FINGER

BACKGROUND OF THE INVENTION

Automation, spurred by ever increasing labor costs, enjoys ever increasing prominence in modern industrial practice. In traditional concept automation uses special purpose machinery and transfer equipment specifically designed for one automated operation. Such automation can only be economically justified where the industrial operation to be automated is of sufficiently long run to offset the cost of the special purpose automation equipment with the automation-resultant savings in labor costs.

Where an industrial operation was of such short run as not to justify complete automation, some economic advantage resulted from semi-automation reducing the skill required of operatives in the operation. Unfortunately, such semi-automation often had the effect of reducing an operative's job to a repetitive but simple operation. The stultifying effect of such simple, repetitive operations on industrial operatives is now widely recognized as a source of low morale among the operatives.

Very recent advances in control technology have brought to this problem the programmable manipulator or robot which can economically perform a repetitive operation of a short run industrial operation and then be reprogrammed for another operation in another run. Such manipulators commonly have article grasping fingers on a hand-like element movable in a variety of directions according to the particular control program provided the manipulator. A variety of such manipulators are now commercially available.

Unlike long-run, special purpose automation equipment which can be precisely adjusted while absorbing time and damage costs as part of the relatively high cost of installing such equipment, the programmable manipulator must be reprogrammed for its precise positioning for each run in which it is to function without time consuming and costly damage. During such programming, there is significant danger that a misalignment of the manipulator will drive the article grasping finger into an obstruction. Similarly, misalignment of a grasped article on which an operation is being performed by another machine may result in excessive force applied through the grasped article to the finger of the manipulator. Either of these excessive forces may damage the finger or mechanism of the manipulator.

SUMMARY OF THE INVENTION

Accordingly, it is an object of the invention to provide an article grasping finger adapted to prevent damage to the finger or connected machine elements when excessive force is applied to the finger.

To this end, the invention provides an article grasping finger disconnectable from an operative connection to machine elements to an inoperative connection to the elements. In its operative connection, the finger is held against movement relative to the elements for article grasping movement with the elements. The operative and inoperative or demi-disconnectable connection of the finger to the machine elements prevents loss or damage to the finger which may otherwise result from its complete detachment and falling from the machine.

In the preferred embodiment of the invention, an indicator detects the demi-disconnection of the finger and provides a signal indication of this condition. Also in the preferred embodiment, the machine elements to which the finger is continually attached are hand elements of a programmable manipulator; however, the invention is equally applicable to other machine elements having article grasping fingers including both long-run, traditional automation equipment and other industrial machines.

DESCRIPTION OF THE DRAWINGS

A preferred embodiment which is intended to be illustrative of and not a limitation on the invention will now be described with reference to the drawings in which:

FIG. 2 is a top view of a portion of the hand and finger shown in FIG. 1;

FIG. 3 shows the hand and finger portion of FIG. 2 in a demi-detached condition;

FIG. 4 shows the end and finger portion in FIG. 2 in another demi-detached condition;

FIG. 5 is a front view of the hand and finger portion shown in FIG. 2; and

FIG. 6 is a front view of the hand and finger portion shown in FIG. 5 with the fingers in a demi-detached condition.

DESCRIPTION OF THE PREFERRED EMBODIMENTS

Figure 1:
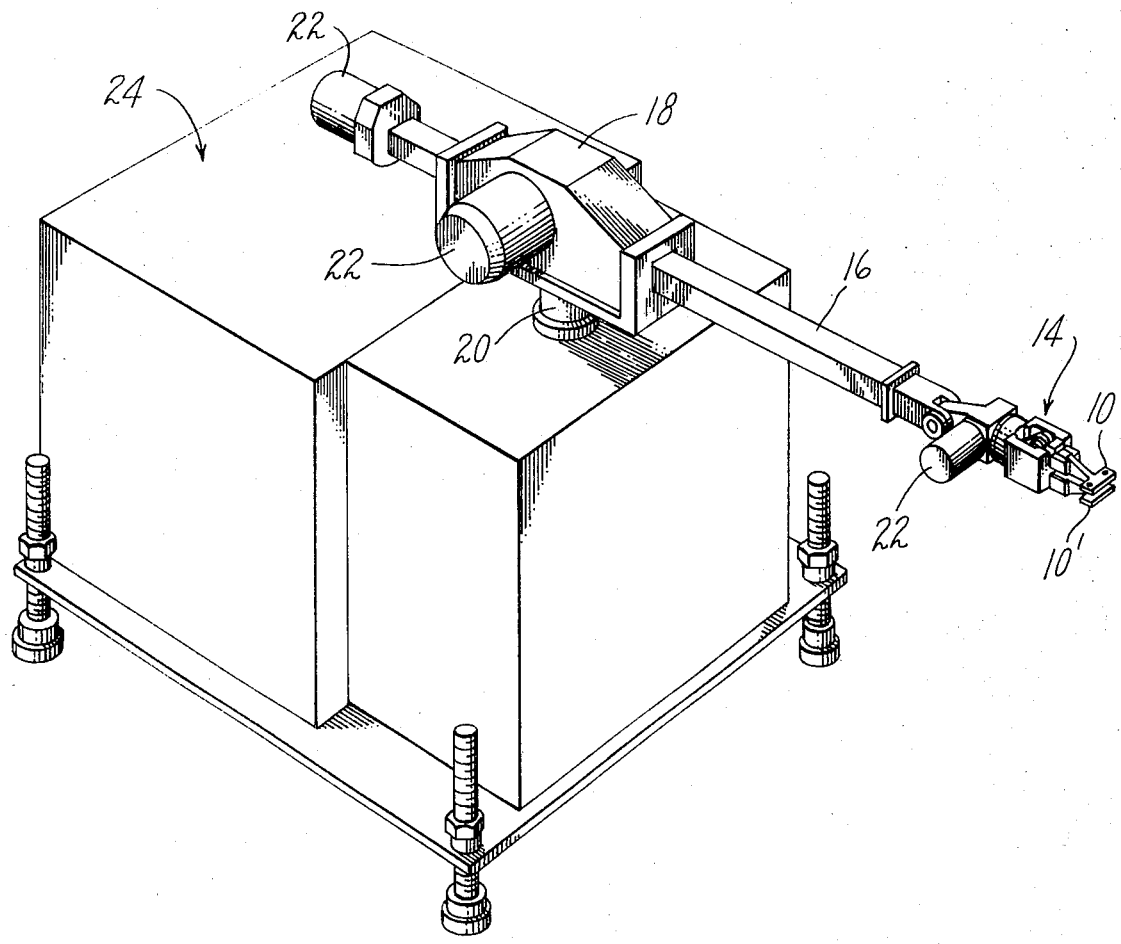
FIG. 1 is a perspective view of a programmable manipulator having a hand and finger of the invention.

In the preferred embodiment shown in FIG. 1, upper and lower demi-disconnectable fingers, 10 and 10' respectively, are connected to machine elements forming a programmable manipulator. The manipulator has an element hereinafter referred to as a hand generally at 14 continually connected to the fingers and mounted for rotation relative to an arm 16 on axes both normal and parallel to a longitudinally extending axis of the arm 16. The arm 16 is mounted for movement along its own longitudinal axis in a turret 18. The turret, in turn, is mounted on a column 20 for movement parallel to and rotationally about a longitudinal axis of the column. A plurality of motors 22 are operatively connected between the elements of the manipulator for moving the elements relative to each other. Each of the motors is electrically connected to a control generally at 24 which may be a commercially available numerical control or other control unit for controlling the motor movement of the manipulator elements.

FIG. 2 is a top view of the upper finger 10 operatively connected at one end to a portion of the hand 14. The finger has an article grasping portion 26 at an end opposite that connecting the finger to the hand. The hand-connecting end of the finger has four generally wedge-shaped connecting projections 28 arranged in upper and lower symmetrically disposed pairs, only the upper pair of which is seen in FIG. 2. The finger connecting projections are received in grooves 29 shaped complementary to the projections or generally v-shaped for firmly connecting the finger to the hand. The grooves are parallelly disposed in oppositely facing, spaced side portions 30 and 32 of the hand. The portion 30 is a rigid extension of the hand 14 while the portion 32 is a separate element of the hand operatively connected to the remainder of the hand by a tongue 34 extending along an edge of the element 32 opposite the grooved edge 29 and received in another groove 36 of the hand. A bolt element 38 of the hand extends between the spaced side portions 30 and 32 and is provided with a compressed spring 40 urging the portion 32 into engagement with finger projections 28 and the groove 36 so as to hold the finger 10 against movement relative to the hand 14 during normal operation of the hand and finger.

In addition to the spring clamping of the finger projections 28 between the grooved ends of the hand portions 30 and 32, the finger is additionally restrained against movement relative to the hand in its operating position by two pins 42. Each pin 42 extends through the hand portion 30 into the projection engaging groove 29 adjacent interior, facing corners of the upper and lower projections 28. The pins extend slightly beyond the groove to form prongs in the groove for restraining sliding movement of the finger projections in the groove. Alternatively, the pins may be located at extreme upper and lower corners of the finger projections engaging the portion 30 or may be replaced by ball catches in the groove; either the pins or balls may be spring loaded to prevent damage when excessive force dislodges the finger to its inoperative position. The hand and finger thus assembled is substantially rigid for article grasping movement of the finger with the connected hand portion.

When excessive force is applied to the finger in a lateral direction, parallel to the plane of FIG. 2, the finger will snap out of its operative connection to the hand as indicated in FIG. 3. The spring 40 then drives the hand portion 32 toward the hand portion 30 about a pivot formed by the tongue 34 and groove 36 abutment of the portion 32 with the rest of the hand 14. A member 44 secured to the portion 32 pivots with the portion 32 to engage a switch lever of a microswitch 46. Thus, the microswitch 46 is a detector providing a signal indicative of the displaced, inoperative condition of the finger, However, even in its inoperative condition, the finger is not completely disconnected from the hand. A strap portion 48 of the finger loosely encircles the bolt 38 to maintain a continual connection of the finger with the hand. The finger thus maintains continual connection to the hand in both an operative position with the projections 28 engaging their cooperative grooves in the hand or in an inoperative position with the strap portion 48 engaging the bolt. Therefore, the finger 10 is demi-disconnectable from the hand 14.

FIG. 4 shows the displacement of the finger resulting from excessive force applied to the finger in a direction into the plane of FIGS. 2 and 4. Again, the spring 40 pivots the hand portion 32 to detect the resulting inoperative condition of the finger by engagement of the member 44 with the switch lever of microswitch 46. Displacement of the finger into a position mirror image symmetrical to that in FIG. 4 of course results from excessive force on the finger directed out of the plane of FIGS. 2 and 4. Again, the resulting demi-disconnection of the finger permits hand portion 32 to pivot member 44 into signal-making contact with detector microswitch 46.

FIG. 5 shows a preferred assembly of a pair of fingers 10 and 10' on a hand 14 comprising a support for each finger. Each finger supporting portion of the hand 14 is mirror image symmetrical with the other to each provide demi-disconnectable, continual support for its respective finger 10 or 10'. Means for moving the hand is shown as a linearly movable piston rod 50. The rod is connected by a pair of links 52 to end portions of each finger supporting portion of the hand, each of which is pivoted on a shaft 54 for scissors-like movement of the connected finger in response to movement of the piston rod toward and away from the hand. Means (not shown) for securing the hand against linear movement with the rod are provided.

FIG. 5 also shows that the fingers 10 and 10', while generally similar, may have different elevational positions of the article gripping end portions 26 and 26' relative to the identical, opposite end portions having the projections 28. Under the symmetrical actuation of the links 52, the article gripping portions 26 and 26' will then close on each other at a line spaced from a line perpendicularly bisecting a line between the pivot shafts 54 of each finger support portion of the hand. Turning over one or both of the fingers 10 and 10' permits adjustment of the line of closure of the article gripping portions 26 and 26' relative to the hand. Such adjustment is useful for certain industrial operations.

FIG. 6 shows the demi-disconnection of each finger 10 and 10' also shown in FIG. 5 which results from excessive force to both fingers directed downwardly in the plane of FIG. 5. Indicating members 44 and 44' associated with the hand support portion for each finger each contact the switch lever of an associated microswitch 46 or 46'. At the same time it is seen that the identical strap portions 48–48' of each finger maintain a continual connection of the fingers with the hand in the illustrated inoperative condition. Damage or loss from dropped fingers 10 and 10' is thereby prevented.

Having thus described our invention, what we claim as new and desire to secure by letters patent is:

1. Apparatus for releasably mounting an article engaging finger in a manipulator having a hand-type grasping device and comprising:
   A. A support bracket;
   B. A finger element mounted for limited movement on the support bracket;
   C. A restraining clamp engaging the finger element to limit movement thereof;
   D. Spring biased disconnecting means on the restraining clamp operatively connected to the finger element to release said finger element from the restraining clamp when excessive forces are applied to said finger element.

2. Apparatus for releasably mounting an article engaging finger of a manipulator having a hand-type grasping device as described in claim 1 further comprising means operatively connected to the spring biased disconnecting means to actuate a switch when the finger element is released from the restraining clamp.

3. Apparatus for releasably mounting an article engaging finger of a manipulator having a hand-type grasping device as described in claim 1 wherein the restraining clamp and the spring biased disconnecting means comprise:
   A. A first element rigidly secured to the support bracket;
   B. A bolt secured to the first element and extending outward therefrom;
   C. A second element mounted on the bolt for movement thereon, said second element extending substantially parallel to the first element, but being biased toward said first element by a spring mounted on the bolt;

D. Means associated with the first and second elements to engage the finger between said elements, said finger being restrained thereby until a force is exerted on the finger sufficient to overcome the bias of the spring and release said finger from engagement.

4. Apparatus for releasably mounting an article engaging finger of a manipulator having a hand-type grasping device as described in claim 3 wherein the finger element is loosely mounted for limited movement in the disengaged position on the bolt.

* * * * *